(12) United States Patent
Shan (10) Patent No.: US 10,558,351 B2
(45) Date of Patent: Feb. 11, 2020

(54) DATA PROCESSING METHOD AND APPARATUS

(71) Applicant: Tencent Technology (Shenzhen) Company Limited, Shenzhen (CN)

(72) Inventor: Baoyin Shan, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 20 days.

(21) Appl. No.: 16/046,725

(22) Filed: Jul. 26, 2018

(65) Prior Publication Data
US 2018/0329600 A1 Nov. 15, 2018

Related U.S. Application Data (63) Continuation-in-part of application No. PCT/CN2017/075436, filed on Mar. 2, 2017.

(30) Foreign Application Priority Data

Mar. 2, 2016 (CN) .......................... 2016 1 0119359

(51) Int. Cl.
*G06F 3/0488* (2013.01)

(52) U.S. Cl.
CPC .. *G06F 3/0488* (2013.01); *G06F 2203/04808* (2013.01)

(58) Field of Classification Search
CPC ..................... G06F 3/0488; G06F 2203/04808
See application file for complete search history.

(56) References Cited

U.S. PATENT DOCUMENTS

| | | | |
|---|---|---|---|
| 8,658,917 B2 * | 2/2014 | Westhues | G06F 3/0237 178/18.03 |
| 2013/0194958 A1 * | 8/2013 | Gustafsson | H04L 65/604 370/252 |
| 2013/0265276 A1 * | 10/2013 | Obeidat | G06F 3/044 345/174 |

FOREIGN PATENT DOCUMENTS

| | | |
|---|---|---|
| CN | 103176633 A | 6/2013 |
| CN | 103501259 A | 1/2014 |

(Continued)

OTHER PUBLICATIONS

Tencent Technology, ISRWO, PCT/CN2017/075436, Jun. 7, 2017, 6 pgs.

(Continued)

*Primary Examiner* — Christopher J Kohlman
(74) *Attorney, Agent, or Firm* — Morgan, Lewis & Bockius LLP (57) ABSTRACT

Embodiments of this application provide a data processing method and apparatus. The method includes: receiving a first data packet sent by a control end, the first data packet including a first touch event and a first identifier of the first touch event; determining, according to the first touch event and the first identifier of the first touch event, whether a second data packet comprising a second touch event sequentially executed with the first touch event is lost; creating the second touch event corresponding to the second data packet in accordance with a determination that a second data packet has been lost; and processing the second touch event that has been created, so that a controlled end performs an application operation in accordance with a touch operation to which the second touch event belongs. In this way, control exceptions caused by packet losses are reduced.

20 Claims, 3 Drawing Sheets

(56) References Cited

FOREIGN PATENT DOCUMENTS

| | | | |
|---|---|---|---|
| CN | 105607859 | A | 5/2016 |
| JP | 10161809 | A | 6/1998 |
| JP | 2013-161221 | A | 8/2013 |
| JP | 2014-123929 | A | 7/2014 |
| JP | 2014-146228 | A | 8/2014 |
| JP | 2015-018325 | A | 1/2015 |

OTHER PUBLICATIONS

Tencent Technology, IPRP, PCT/CN2017/075436, Sep. 4, 2018, 5 pgs.

\* cited by examiner

DATA PROCESSING METHOD AND APPARATUS

CROSS-REFERENCE AND RELATED APPLICATIONS

This application is a continuation-in-part application of PCT Application No. PCT/CN2017/075436, entitled "DATA PROCESSING METHOD AND APPARATUS", filed Mar. 2, 2017, which claims priority to Chinese Patent Application No. 201610119359.X, filed with the Chinese Patent Office on Mar. 2, 2016, and entitled "DATA PROCESSING METHOD AND APPARATUS", all of which are incorporated herein by reference in their entirety.

FIELD OF THE TECHNOLOGY

This application relates to the field of data processing technologies, and in particular, to a data processing method and apparatus.

BACKGROUND OF THE DISCLOSURE

With development of communication technologies, a technology using an intelligent electronic device with a touchscreen (a mobile phone, a handheld computer, or the like with a touchscreen) to control another intelligent device has been widely used. For example, a mobile phone with a touchscreen may be used to control a smart game console.

In a process of using an intelligent electronic device with a touchscreen to control another intelligent device, the intelligent electronic device used as a control end detects a touch event on the touchscreen, and sends, by means of Bluetooth or WiFi or in another wireless communication manner, or in a wired communication manner, a data packet including information about the touch event to the another intelligent device used as a controlled end, to control the another intelligent device. However, in an environment with interference, the data packet sent by the intelligent electronic device used as a control end may not be completely received by the intelligent device used as a controlled end, that is, a packet loss phenomenon occurs, causing a control exception.

SUMMARY

This application provides a data processing method and apparatus, to reduce control exceptions caused by packet losses in a control process.

A data processing method is performed at a device (e.g., a controlled device or an electronic data controller installed on the controlled device (e.g., a plug-in hardware interface with packet loss detection and remediation capabilities on its own or in conjunction with the processors of the controlled device (e.g., a game console, a smart home appliance (e.g., smart vacuum cleaner, a smart thermostat), an unmanned aerial vehicle, etc.))) having one or more processors and memory. The method includes:

receiving a first data packet sent by a control end, the first data packet including a first touch event and a first identifier of the first touch event, the first identifier being configured to distinguish between different touch points simultaneously generated on a touch-sensitive surface, and to not distinguish individual touch points sequentially generated on the touch-sensitive surface having a same first identifier;

determining, according to the first touch event and the first identifier of the first touch event, whether a second data packet including a second touch event that was sequentially executed with the first touch event has been lost during transit from the control end to the device;

in accordance with a determination that a second data packet comprising a second touch event that was sequentially executed with the first touch event at the control end has been lost during transit from the control end to the device, creating, without requiring further instruction from the control end, the second touch event corresponding to the second data packet; and processing the second touch event, so that a controlled end performs a respective operation in an application in accordance with a touch operation including the second touch event.

A device includes one or more processors, memory, and a plurality of instructions stored in the memory that, when executed by the one or more processors, cause the device to perform the aforementioned method. A non-transitory computer readable storage medium storing a plurality of instructions configured for execution by a computer server having one or more processors, the plurality of instructions causing the computer server to perform the aforementioned method.

Based on the foregoing technical solution, in the embodiments of this application, after a data packet is received at the controlled end, the controlled end determines whether an earlier data packet has been lost during transit (e.g., based on known event sequences, and event types of the touch events included in the presently received and earlier received data packets), and if the controlled end determines that an earlier data packet has been lost during transit, the controlled end automatically creates a second touch event corresponding to the lost data packet without requiring further instructions from the control end. In this way, operations can be performed in accordance with touch operations that include both touch-events actually received from the controlled end, and gap-filling touch-events that are locally generated at the controlled end. Accordingly, control exceptions caused by losses of data packets including a touch event can be reduced, and the controlled device are operated more smoothly in an environment where there is poor wireless transmission quality between the control device and the controlled device. In some embodiments, the loss detection and touch-event recovery (e.g., via local creation at the controlled device) is implemented on a hardware interface device (e.g., a plug-in adaptor) with the instructions stored thereon, where the instructions are executed by the processor of the controlled device. This hardware interface can be plugged in onto the controlled devices after the controlled devices have been distributed to consumers, expanding the capabilities of the controlled devices that do not have these packet loss detection and recovery capabilities.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

The following clearly and completely describes the technical solutions in the embodiments of this application with reference to the accompanying drawings in the embodiments of this application. Apparently, the described embodiments are merely some rather than all of the embodiments of this application. All other embodiments obtained by a person of ordinary skill in the art based on the embodiments of the present disclosure without creative efforts fall within the protection scope of the present disclosure.

This application is applicable to a scenario in which an intelligent electronic device with a touch-sensitive surface (e.g., a touch-screen that integrates a touch-sensitive surface with a display, or a trackpad that is used to control a focus selector displayed on a display) is used to control another intelligent device. An intelligent electronic device used as a control end has a touch-sensitive surface. For example, the control end may be a mobile phone, a handheld computer, a tablet computer, or the like with a touchscreen. An intelligent device used as a controlled end has a computing processing capability, but may not has a touchscreen or a display screen.

The intelligent electronic device used as the control end may be connected to the intelligent device used as the controlled end in a wired or wireless manner. For example, the control end and the controlled end may be connected to each other by means of Bluetooth or WiFi or in another wireless manner, or may be directly connected to each other by using a physical circuit such as a universal serial bus (USB). In some embodiments, the device implementing the data packet loss detection and event recovery methods is implemented as a hardware adaptor that physically connects the controlled device and the control device.

The intelligent electronic device used as the control end may detect a touch action of a user on the touchscreen, generate a touch event, and then send the touch event in a form of a data packet to the intelligent device used as the controlled end. After receiving the data packet sent by the control end, the intelligent device used as the controlled end parses out the touch event included in the data packet, and executes the touch event, to respond to an operation of the user. A mobile phone controlled game console is used as an example. A user may output a touch action on a touchscreen mobile phone, the mobile phone detects the touch and generates a touch event, and after receiving the touch event, the game console makes a response, so that a corresponding action is generated on a game interface of the game console.

Figure 1:
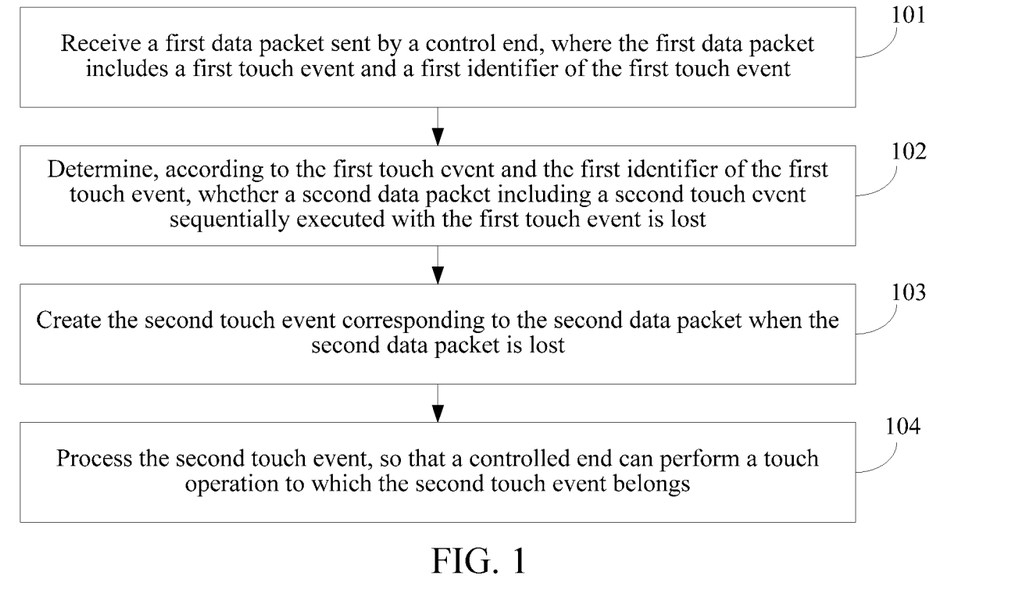
FIG. 1 is a schematic flowchart of an embodiment of a data processing method according to this application.

Referring to FIG. 1, FIG. 1 is a schematic flowchart of an embodiment of a data processing method according to this application. The method of this embodiment may include the following steps:

S101. Receive a first data packet sent by a control end.

The first data packet includes a first touch event and a first identifier of the first touch event. The first identifier is configured to distinguish between different touch points simultaneously generated on a touch-sensitive surface (e.g., a touch-screen or a trackpad), and to not distinguish between individual touch points sequentially generated on the touch-sensitive surface having an identical first identifier (e.g., a same first identifier).

The first identifier is an identification mode used in a touchscreen device for distinguishing between multiple points simultaneously existing on a touchscreen. For example, for multi-touch of an Android system, the system allocates an ID to each touch point (e.g., each finger contact), and the system distinguishes between multiple touch points according to the IDs. For ease of understanding, for example, if there are three touch points simultaneously existing on a touchscreen, first identifiers of the three touch points may be respectively labeled as point ID0, point ID1, and point ID2. Assuming that the three touch points are all released at a moment, when two touch points are detected again on the touchscreen after the moment, first identifiers point ID0 and point ID1 are sequentially allocated to the two touch points of the touchscreen. Assuming that a touch point with the identifier point ID1 in the three touch points is up, the first identifier point ID1 is released. If two touch points are received again after the moment, there are four touch points simultaneously existing at a position on the touchscreen. Because the first identifiers point ID0 and point ID2 are occupied, first identifiers point ID1 and point ID3 are respectively allocated to the two subsequently received touch points.

S102. Determine, according to a first touch event and a first identifier of the first touch event, whether a second data packet including a second touch event that was sequentially executed with the first touch event has been lost during transit from the control end to the device.

In an implementation, the second data packet is a data packet that causes a touch operation to which the first touch event belongs not to be capable of being identified by a controlled end. If the second touch event in the second data packet is lost, the controlled end cannot identify the first touch event, or even if the first touch event can be identified, the controlled end cannot terminate the first touch event.

In an actual application, a touch operation of a user is a series of touch actions, and a correspondingly generated touch control event includes a continuous touch event sequence. The touch event sequence may sequentially include a touch-down event, a touch move event, and a touch-up event (e.g., in a swipe input). The touch slide event may be optional. That is, the touch event sequence may include only a touch-down event and a touch-up event (e.g., in a tap input, or a press input).

For example, a touch operation of a user on a touchscreen may be as follows: The user first touches down on the screen and then slide on the screen, and finally, a touch point is released. In this case, an obtained touch event sequence may be sequentially: a touch-down event, a touch slide event, and a touch-up event. Alternatively, a touch operation of a user may be as follows: The user first taps the screen and then release a touch point. In this case, an obtained touch event sequence is sequentially: a touch-down event and a touch-up event.

It can be learned based on the touch event sequence that after a touch-down event of a touch point is received, if no touch-up event triggered by the touch point is received, it indicates that the touch-up event corresponding to the touch point is lost. Consequently, the controlled end cannot determine whether the touch operation ends. Correspondingly, if the controlled end does not receive the touch-down event of the touch point, but receives only the touch-up event of the touch point, it indicates that the touch-down event of the touch point is lost. Consequently, there is no corresponding touch-down event before the touch-up event, an event sequence of a received touch event is inconsistent with that of the touch event sequence, and the controlled end cannot identify the touch-up event.

It may be understood that the controlled end can consider two touch events as sequentially generated touch events only when the first identifier of the second touch event that is included in the second data packet is the same as the first identifier of the first touch event. As a result, the controlled end cannot identify sequentially received touch events according to the touch event sequence only when a touch event generated by two adjacent touch operations indicated by a same first identifier is lost. Therefore, the second data packet may be a data packet including the second touch event and the first identifier of the second touch event, and the first identifier of the second touch event is the same as the first identifier of the first touch event.

It may be understood that in this embodiment of this application, the second data packet may be a data packet sent before the control end sends the first data packet, or may be a data packet sent after the first data packet is sent.

S103. In accordance with a determination that a second data packet comprising a second touch event that was sequentially executed with the first touch event at the control end has been lost during transit from the control end to the device, create, without requiring further instruction from the control end, the second touch event corresponding to the second data packet. In accordance with a determination that there was no loss of data packet in relation to the first touch event, the device does not create the second touch event.

The creating the second touch event may be construed as creating code, an instruction, data coordinates and/or the like representing the second touch event.

S104. Process the second touch event, so that a controlled end can perform a respective operation in an application at the controlled end in accordance with a touch operation including the second touch event that has been lost in transit and that has been created locally at the controlled end. The application is a control application for controlling movement or operation of a smart appliance, an unmanned drone, a gaming console running a game, etc.

After it is determined that a lost data packet is the second data packet including the second touch event, the second touch event in the second data packet is recreated, resolving a problem that the controlled end cannot identify the first touch event or cannot terminate the first touch event because the touch event in a touch control sequence is lost.

The processing the second touch event may be specifically: sending the second touch event to a driver layer of an operating system of the controlled end, to execute the second touch event at the driver layer.

It may be understood that the lost second data packet may be a data packet sent before the first data packet, or may be a data packet sent after the first data packet, and a sequential order in which the controlled end executes touch events in the data packet is based on an actual sending sequence of the touch events. Therefore, if the second data packet is a data packet sent by a transmit end before sending the first data packet, the second touch event of the second data packet needs to be first executed at the driver layer of the controlled end, and then the first touch event is executed. If the second data packet is a touch event sent by the controlled end after sending the first data packet, the first touch event has been executed at the driver layer before the second touch event is executed at the driver layer.

After the second data packet and the first data packet are determined, a generation order of the two data packets is determined. That is, there is a specified generation order between the second touch event corresponding to the second data packet and the first touch event. Therefore, in some embodiments, the second touch event may be processed based on the specified generation order, so that a sequential order in which the controlled end processes the second touch event and the first touch event is the same as the generation order.

For example, the second data packet is the touch-down event, and the first data packet is the touch-up event. It may be determined that the transmit end first sends the second data packet, and then sends the first data packet. In this case, after the touch-down event corresponding to the second data packet is created, the touch-down event is sent to the driver layer for execution, and then the touch-up event of the first data packet is sent to the driver layer for execution.

In this embodiment of this application, after receiving a first data packet, a controlled end determines, according to a first identifier of a first touch event that is included in the first data packet, whether a second data packet is lost. If the second data packet is lost, a second touch event corresponding to the second data packet is created and executed. In this way, control exceptions caused by losses of data packets including a touch event can be reduced.

It may be understood that if there are different sequential orders in which the controlled end sends the second data packet and the first data packet, there may be different processes in which the controlled end determines whether the second data packet is lost.

Different manners of determining the lost second data packet are separately described below.

Figure 2:
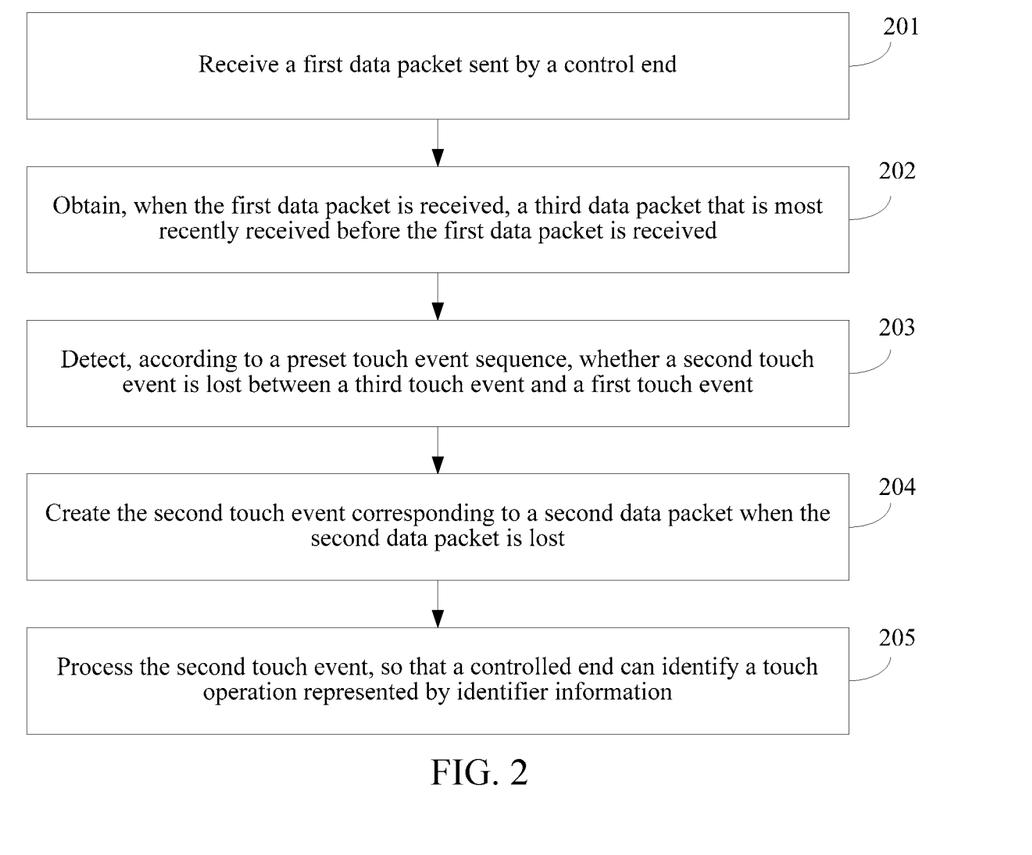
FIG. 2 is a schematic flowchart of another embodiment of a data processing method according to this application.

Referring to FIG. 2, FIG. 2 is a schematic flowchart of another embodiment of a data processing method according to this application. The method of this embodiment may include the following steps:

S201. Receive a first data packet sent by a control end (e.g., refer to S101).

The first data packet includes a first touch event and a first identifier of the first touch event. The first identifier is configured to distinguish between different touch points simultaneously generated on a touchscreen, and individual touch points sequentially generated on the touchscreen have a same first identifier.

S202. Obtain, when the first data packet is received, a third data packet that is most recently received before the first data packet is received.

The third data packet includes a third touch event and a first identifier of the third touch event. It should be noted that the third data packet obtained in step 202 is a data packet whose included first identifier of the third touch event is the same as the first identifier of the first touch event.

In this embodiment, when a data packet including a touch event is received, status information corresponding to the touch event such as event content of the touch event (for example, the touch event is a touch-up event) or a first identifier of the touch event is recorded. Certainly, the status information of the touch event may further include: touch position coordinates of the touch event, an occurrence time of the touch event, or the like.

S203. Detect, according to a preset touch event sequence, whether at least one touch event (e.g., a second touch event) is lost/missing between the third touch event and the first touch event.

The touch event sequence may sequentially include a touch-down event, a touch move event, and a touch-up event. Certainly, the touch event sequence may be set in such a manner as sequentially including: a touch-down event and a touch-up event.

It may be understood that when the first identifier of the third touch event is the same as that of the first touch event, a sequential order between the third touch event and the first touch event should be consistent with a sequence looping execution order of the touch event sequence. That is, multiple consecutive touch event sequences having a same first identifier should be a cyclic sequence: a touch-down event, a touch slide event (there may be multiple consecutive touch slide events), a touch-up event, a touch-down event, a touch slide event, . . . . The touch slide event is optional. Therefore, possible cases between the third touch event and the first touch event may be determined according to the cyclic sequence. If the third touch event and the first touch event do not conform to the cyclic sequence, it indicates that a data packet is lost. In addition, one or more touch events whose data packets are lost may be determined according to the cyclic sequence.

For example, a first identifier of a touch point A at a position point A on the touchscreen of the control end is point ID0. Events triggered by the touch point A are sequentially a touch-down event A1 and a touch-up event A2. After the touch point A is released, a touch point B is added to a position point B on the touchscreen, and a first identifier of the touch point B is also point ID0. It is assumed that touch events sequentially triggered by the touch point B are a touch-down event B1 and a touch move event B2. It is assumed that the first data packet sent by the control end and received by a controlled end at a current moment includes a touch move event B2. If the third data packet with the first identifier that is most recently received by the controlled end includes the touch-up event A2, and it may be learned according to the touch event sequence that a touch move event cannot occur for the touch-down event, it indicates that the touch-down event B1 corresponding to the touch move event B2 is lost.

Certainly, in an actual application, there may be multiple manners of detecting, according to the touch event sequence, whether the second touch event is lost between the third touch event and the first touch event.

In some embodiments, a detection manner may be: in accordance with a determination that the first touch event is a touch-down event: determining whether the third touch event is a touch-up event; in accordance with a determination that the third touch event is not a touch-up event, determine that a touch event corresponding to the touch-up event in the touch event sequence is lost between the third touch event and the first touch event, where the lost touch-up event and the third touch event belong to a same touch operation; and in accordance with a determination that the third touch event is a touch-up event, determining that a touch event has not been lost between the first touch event and the third touch event; and in accordance with a determination that the third touch event is not one of a touch-down event or a touch move event, determining whether the third touch event is one of a touch-down event or a touch move event; in accordance with a determination that the third touch event is not one of a touch down event or a touch move event, determining that a touch event corresponding to the touch-down event in the touch event sequence is lost between the third touch event and the first touch event, where the lost touch-down event and the first touch event belong to a same touch operation; and in accordance with a determination that the third touch event is one of a touch down event or a touch move event, determining that a touch event has not been lost between the first touch event and the third touch event.

Certainly, a possible case in which the second touch event is lost may be further obtained through analysis in advance according to the touch event sequence when the third touch event and the first touch event are various possible touch events, and then a comparison table including the third touch event, the first touch event, and the lost second touch event is generated. Subsequently, the lost second touch event may be determined by looking up the comparison table.

For example, the following Table 1 may be viewed for reference:

TABLE 1

| First touch event | Third touch event | Loss status | Second touch event |
|---|---|---|---|
| DOWN(x, y) | UP (x', y') | N/A | |
| | MOVE (x', y') | UP | UP(x', y') |
| | DOWN (x', y') | UP | UP(x', y') |
| MOVE(x, y) | UP (x', y') | DOWN | DOWN(x, y) |
| | MOVE (x', y') | N/A | |
| | DOWN (x', y') | N/A | |
| UP(x, y) | UP (x', y') | DOWN | DOWN(x, y) |
| | MOVE (x', y') | N/A or MOVE | if(x, y != x', y') insert MOVE(x, y) else N/A |
| | DOWN (x', y') | N/A or MOVE | |

(x, y) and (x', y') in Table 1 are used for indicating two touch position points of two touch events. (x, y) and (x', y') may be a same position point, or may be two different position points.

DOWN indicates a touch-down event. For example, DOWN (x, y) indicates a touch-down event at a position point (x, y). Move indicates a touch move event. UP indicates a touch-up event. N/A indicates that no touch event is lost.

For example, if the first touch event is a touch-down event DOWN (x, y), and the third touch event is DOWN (x', y'), it may be learned from Table 1 that a touch-up event is lost, and the touch-up event and the third touch event DOWN (x', y') belong to a same touch operation, that is, a touch-up event UP (x', y') at a position point (x', y') is lost.

S204. Create the second touch event corresponding to a second data packet when the second data packet is lost (e.g., referring to S103).

After a lost second touch event is determined, the second touch event may be directly created.

In some embodiments, in an embodiment, the first data packet further includes touch position coordinates of the first touch event. Correspondingly, the third data packet further includes touch position coordinates of the third touch event. In this way, when only a touch event type of the determined second touch event is determined, touch position coordinates of the second touch event may be determined according to the touch position coordinates of the first touch event or the touch position coordinates of the third touch event. The second touch event including the touch position coordinates is created according to the touch position coordinates of the second touch event.

For example, if the first touch event and the second touch event belong to a same touch operation, the touch position coordinates of the first touch event are used as position coordinates of the second touch event. If the third touch event and the second touch event belong to a same touch operation, the touch position coordinates of the third touch event are used as position coordinates of the second touch event.

Certainly, when the first touch event and the third touch event both include the touch position coordinates, the second touch event determined in step 203 may be specifically the second touch event at second position coordinates. The second position coordinates may be determined according to whether the second touch event and the first touch event or the third touch event belong to a same touch operation, or may be determined according to Table 1.

S205. Process the second touch event, so that a controlled end can identify a touch operation represented by identifier information (e.g., refer to S104).

In this embodiment, the created second touch event may be first sent to a driver layer for execution, and then the first touch event is sent to the driver layer for execution.

It may be understood that when the third touch event and the first touch event belong to different touch events, not all lost second touch events may be determined in the manner of the embodiment of FIG. 2. In this case, control accuracy may not be improved although control exceptions can be reduced only in the manner of Embodiment 2.

For example, referring to Table 1, if the first touch event is MOVE (x, y), when the third touch event is MOVE (x', y'), it may be determined, according to Table 1, that no third touch event is lost. However, a user may lift a finger after performing a touch slide operation at a position point (x, y) on the touchscreen of the control end. In this case, a touch event generated by the control end should be MOVE (x, y) and UP (x, y). Before the third touch event MOVE (x', y'), the user might have also performed a touch-down operation on the touchscreen, for example, a touch-down event DOWN (x', y'). Because the first touch event and the third touch event are considered to be belonging to a same touch operation in Table 1, it cannot be determined that UP (x, y) and DOWN (x', y') are lost. In this case, the controlled end does not recreate the two events, causing inconsistency of an event execution process on the controlled end and an actual input by a user on the control end.

Figure 3:
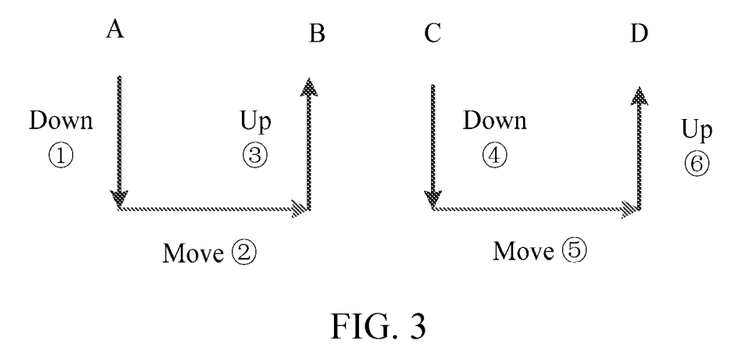
FIG. 3 is a schematic diagram of touch processes of two touch operations.

For ease of understanding, referring to FIG. 3, FIG. 3 is a schematic diagram of a touch process of two touch operations represented by a same first identifier. In FIG. 3, a user presses at a touch point A and moves to lift at a touch point B, to complete a touch operation. Subsequently, the user presses at a touch point C, starts another touch operation, and continues to slide to lift at a touch point D. It can be seen from FIG. 3 that if touch events represented by ③ and ④ are lost, a touch event represented by ⑤ and received by a controlled end is MOVE (x', y'), and a touch event received by the controlled end last time should be MOVE (x, y) represented by ②. If the touch event being MOVE (x', y') represented by ⑤ and the touch event MOVE (x, y) represented by ② belong to a same touch operation, a touch-up event and a touch-down event are not lost. If the touch event being MOVE (x', y') represented by ⑤ and the touch event MOVE (x, y) represented by ② are the two touch operations shown in FIG. 3, it indicates that a touch-down event DOWN of a touch operation to which the touch event being MOVE (x', y') represented by ⑤ belongs is lost. Correspondingly, a touch-up operation UP of another touch operation to which the touch event MOVE (x, y) represented by ② belongs is lost.

Therefore, to distinguish whether a third touch event and a first touch event belong to different touch operations, a second identifier may be further allocated to different touch operations of touch points having first identifiers. The second identifier is used for identifying different touch operation having a same first identifier.

Correspondingly, a first data packet received by the controlled end further includes a second identifier of a first touch event. The third data packet may also include a second identifier of the third touch event. Detecting whether at least one touch event (e.g., a second touch event) is lost may be:

detecting, according to a preset touch event sequence, the second identifier of the third touch event, and the second identifier of the first touch event, whether at least one touch event (e.g., the second touch event) is lost between the third touch event and the first touch event.

It may be determined, according to the second identifier, whether the third touch event and the first touch event belong to a same touch operation. In this way, it may be determined, according to a cyclic order of the touch event sequence and whether the third touch event and the first touch event belong to a same touch operation, whether a touch event is lost between the third touch event and the first touch event, and the lost second touch event may be determined.

In some embodiments, a detection manner may be:

in accordance with a determination that the third touch event is not a touch-up event, determining whether the third touch event is a touch-up event; and in accordance with a determination that the third touch event is not a touch-up event, determining that a touch event corresponding to the touch-up event in the touch event sequence is lost/missing between the third touch event and the first touch event, where the lost/missing touch-up event and the third touch event belong to a same touch operation; and in accordance with a determination that the third touch event is a touch-up event, determining that there is no missing touch event between the first and third touch events;

in accordance with a determination that the first touch event is not a touch-down event: determining whether the third touch event is one of a touch-down event or a touch move event; in accordance with a determination that the first touch event is one of a touch-down event or a touch move event, determining that a touch event corresponding to the touch-down event in the touch event sequence is lost between the third touch event and the first touch event, where the lost touch-down event and the first touch event belong to a same touch operation; and in accordance with a determination that the first touch event is one of a touch-down event or a touch move event, determining that there is no missing touch event between the first and third touch events; and in accordance with a determination that the first touch event is not a touch-down event and a determination that the third touch event is not one of a touch-down event and a touch-move event: determining whether the second identifier of the third touch event is the same as the second identifier of the first touch event; in accordance with a determination that the second identifier of the third touch event is not the same as the second identifier of the first touch event, determining that two touch events corresponding to the touch-up event and the touch-down event in the touch event sequence are sequentially lost between the third touch event and the first touch event, where a respective one of the two missing touch events corresponding to the touch-up event in the touch event sequence and the third touch event belong to a same touch operation, and a respective one of the two missing touch events corresponding to the touch-down event in the touch event sequence and the first touch event belong to a same touch operation.

Certainly, in an actual application, a correspondence between a third touch event, a first touch event, and a second touch event may also be established in advance as in the manner of Table 1, and then at least one lost second touch event is determined by looking up the table.

For ease of understanding, a case in which the second touch event is determined according to the correspondence between the third touch event, the first touch event, and the second touch event that is established in advance is briefly described by using a loss status in FIG. 3 as an example.

For a correspondence established when the first touch event and the third touch event belong to different touch operations, refer to the following Table 2.

TABLE 2

| Lost events | First touch event | Third touch event | Second touch event |
| --- | --- | --- | --- |
| ③④ | MOVE(x, y) | MOVE (x', y') | UP(x', y')--->DOWN(x, y) |
| ②③④ | MOVE(x, y) | DOWN (x', y') | UP(x', y')--->DOWN(x, y) |
| ③④⑤ | UP(x, y) | MOVE (x', y') | UP(x', y')--->DOWN(x, y) |
| ②③④⑤ | UP(x, y) | DOWN (x', y') | UP(x', y')--->DOWN(x, y) |

It should be noted that the column lost events in Table 2 is added for the case of FIG. 3, and is merely used for verifying the correspondence in Table 2 for the case of FIG. 3. However, it may be understood that the correspondence in Table 2 is also applicable to another case.

It may be learned from Table 2 that when the touch events represented by ③ and ④ in FIG. 3 are lost, a first touch event currently received by the controlled end is MOVE (x, y), a third touch event is MOVE (x', y'), and the two touch events do not belong to a same touch operation. In this case, it may be learned by looking up Table 2 that the lost touch events are a touch-up event up (x', y') at a position point (x', y') and a touch-down event down (x, y) at a position point (x, y).

In some embodiments, similar to the embodiment of FIG. 2, in this embodiment, the first data packet further includes touch position coordinates of the first touch event. Correspondingly, the third data packet further includes touch position coordinates of the third touch event. In this case, when a second touch event is created, touch position coordinates of the second touch event may also be determined similarly according to the touch position coordinates of the first touch event or the touch position coordinates of the third touch event. The second touch event including the touch position coordinates is created according to the touch position coordinates of the second touch event.

Figure 4:
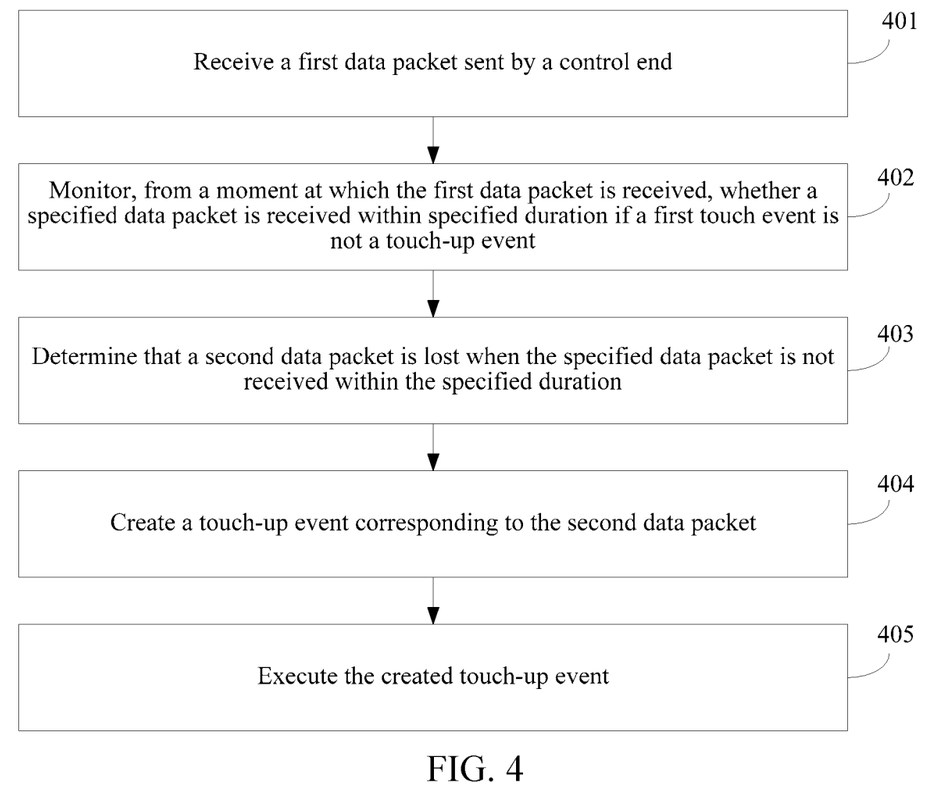
FIG. 4 is a schematic flowchart of another embodiment of a data processing method according to this application.

Referring to FIG. 4, FIG. 4 is a schematic flowchart of another embodiment of a data processing method according to this application. The method of this embodiment may include the following steps:

S401. Receive a first data packet sent by a control end (e.g., refer to S101 and S201).

The first data packet includes a first touch event and a first identifier of the first touch event. The first identifier is configured to distinguish between different touch points simultaneously generated on a touchscreen, and individual touch points sequentially generated on the touchscreen have a same first identifier.

S402. Monitor, from a moment at which the first data packet is received, whether a specified data packet is received within specified duration in accordance with a determination that a first touch event is not a touch-up event.

A first identifier in the specified data packet is the same as the first identifier of the first data packet.

It may be understood that if the first touch event is not the touch-up event, it indicates that a touch operation still does not end. In this case, if no touch event identified by the same first identifier is received for a long time, it indicates that a data packet of a touch-up event of the touch operation has been lost.

For example, when a user performs a touch-down operation on the touchscreen of the control end, a first data packet currently received by a controlled end includes a touch-down event. The user releases a touch point on the touchscreen after the current moment, but a data packet including a touch-up event and sent by the control end to the controlled end is lost. In this case, the controlled end cannot learn that the touch-up event of a current touch operation has been generated, but continues to wait for a receiving instruction. If the user does not input a touch operation for a long time, the controlled end remains in a waiting state, causing a control exception.

To resolve the foregoing problem of control exception caused by the loss of the data packet, in this embodiment, after the data packet is received, if a touch event included in the data packet is not the touch-up event, a moment at which the data packet is received is used as a starting point of monitoring, to monitor whether a data packet including the first identifier is received within specified duration.

In some embodiments, step 402 may also be: starting a timer at a moment at which the first data packet is received, and using the moment at which the first data packet is received as a starting point of timing, to monitor whether a specified data packet is received within specified duration.

S403. Determine that a second data packet has been lost in accordance with a determination that the specified data packet is not received within the specified duration from the moment at which the first data packet is received.

Determine that the second data packet includes a touch-up event, and the second data packet and the first touch event belong to a same touch operation.

In some embodiments, in this embodiment, the specified data packet may also include touch position coordinates of a touch point. In this case, the determined second data packet may also include touch position coordinates of a lost touch-up event. For example, the touch position coordinates included in the specified data packet may be used as the touch position coordinates of the touch-up event.

S404. Create a touch-up event corresponding to the second data packet (e.g., refer to S103 and S204).

Similar to the foregoing embodiment, the created touch-up event may be code representing that a touch event is the touch-up event, or may include the touch position coordinates of the touch-up event.

S405. Execute the created touch-up event (e.g., refer to S104 and S205).

For example, the created touch-up event may be transmitted to a driver layer of the controlled end for execution.

It may be understood that when a position at which a finger touches the touchscreen of the terminal remains unchanged, the control end no longer generates any touch event. In this case, the controlled end cannot receive any touch event sent by the control end for a long time. Therefore, if the manner of the embodiment of FIG. 4 is used, the controlled end may consider a case in which the touch point remains unchanged as a case in which a touch-up event is lost. Consequently, the controlled end cannot distinguish between the two cases in which the touch point remains unchanged and the touch-up event is lost.

In some embodiments, a heartbeat sending mechanism may be added on the control end. When the control end detects that the touch point does not send a movement signal exceeding specified duration, the control end may send a heartbeat message to the controlled end according to a preset period and in a process in which a position of the touch point remains unchanged, to notify such case to the controlled end. For example, the control end sends a heartbeat message every 200 ms.

Correspondingly, if the controlled end receives the heartbeat message specified duration, it is determined, from a moment at which the heartbeat message is received, a target moment at which the message should arrive after the specified duration. The target moment is updated to a stop moment of the specified duration, and it is monitored, within specified duration after the updating, whether the specified data is received.

In some embodiments, when a timer is used for timing of specified duration in the embodiment of FIG. 4, before the timer reaches the specified duration, in accordance with a determination that a heartbeat message is received within the specified duration of receipt of the first data packet, the timer may be updated, and the timer is set in such a manner that the timer performs timing again by using a moment at which the heartbeat message is received as a starting point of timing.

It should be noted that in the foregoing embodiment of this application, the multiple manners of determining whether a second data packet is lost may be independently performed. In some embodiments, to reduce as many control exceptions as possible, the foregoing multiple manners of determining the second data packet may be simultaneously performed.

For example, a third data packet corresponding to the first data packet may be obtained after the first data packet is received. When it is detected, according to a touch event sequence, whether a second data packet is lost between the first data packet and the third data packet, if the first touch event included in the first data packet is not the touch-up event, it may be further monitored, by using a moment at which the first data packet is received as a starting moment, whether a specified data packet is received within specified duration after the first data packet is received.

Correspondingly, in the embodiment of FIG. 4, when the specified data packet is received within the specified duration, the specified data packet is used as the first data packet, and the first data packet is used as the third data packet. In addition, it is detected, according to the manner described in the foregoing embodiment, whether a second data packet is lost between the determined first data packet and the third data packet.

The following describes a data processing apparatus provided in the embodiments of the present disclosure. The data processing apparatus described below and the data processing method described above may correspond to each other and may be used for cross reference.

Figure 5:
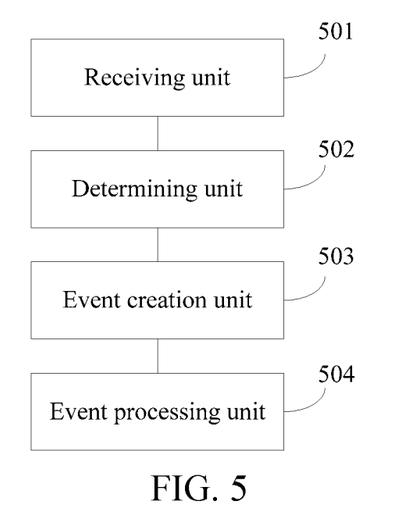
FIG. 5 is a schematic structural diagram of a data processing apparatus according to this application.

Referring to FIG. 5, FIG. 5 is a schematic structural diagram of an embodiment of a data processing apparatus according to this application. The apparatus of this embodiment may include:

a receiving unit 501, configured to receive a first data packet sent by a control end, where the first data packet includes a first touch event and a first identifier of the first touch event, the first identifier is configured to distinguish between different touch points simultaneously generated on a touchscreen, and individual touch points sequentially generated on the touchscreen have a same first identifier;

a determining unit 502, configured to determine, according to the first touch event and the first identifier of the first touch event, whether a second data packet including a second touch event sequentially executed with the first touch event is lost;

an event creation unit 503, configured to create the second touch event corresponding to the second data packet when the second data packet is lost; and an event processing unit 504, configured to process the second touch event, so that a controlled end can perform a touch operation to which the second touch event belongs.

In some embodiments, there is a specified generation order between the second touch event corresponding to the second data packet and the first touch event; and the event processing unit is configured to process the second touch event based on the specified generation order, so that a sequential order in which a controlled end processes the second touch event and the first touch event is the same as the generation order.

In some embodiments, in a possible implementation, the determining unit may include:

a historical obtaining unit, configured to obtain, when the first data packet is received, a third data packet that is most recently received before the first data packet is received, where the third data packet includes a third touch event and a first identifier of the third touch event, where the first identifier of the third touch event is the same as the first identifier of the first touch event; and an event detection unit, configured to detect, according to a preset touch event sequence, whether the second touch event is lost between the third touch event and the first touch event.

In some embodiments, the touch event sequence sequentially includes a touch-down event, a touch move event, and a touch-up event.

The event detection unit includes:

a first detection subunit, configured to: determine whether the third touch event is the touch-up event if the first touch event is the touch-down event, and if not, determine that the touch-up event in the touch event sequence is lost between the third touch event and the first touch event, where the lost touch-up event and the third touch event belong to a same touch operation; and a second detection subunit, configured to: determine whether the third touch event is the touch-down event or the touch move event if the first touch event is not the touch-down event, and if not, determine that the touch-down event in the touch event sequence is lost between the third touch event and the first touch event, where the lost touch-down event and the first touch event belong to a same touch operation.

In some embodiments, the first data packet further includes a second identifier, and the second identifier is used for identifying different touch operations having a same first identifier.

The event detection unit includes:

an event detection subunit, configured to detect, according to the preset touch event sequence, a second identifier of the third touch event, and a second identifier of the first touch event, whether the second touch event is lost between the third touch event and the first touch event.

In some embodiments, the touch event sequence sequentially includes a touch-down event, a touch move event, and a touch-up event.

The event detection subunit includes:

a first detection subunit, configured to: determine whether the third touch event is the touch-up event if the first touch event is the touch-down event, and if not, determine that the touch-up event in the touch event sequence is lost between the third touch event and the first touch event, where the lost touch-up event and the third touch event belong to a same touch operation;

a second detection subunit, configured to: determine whether the third touch event is the touch-down event or the touch move event if the first touch event is not the touch-down event, and if not, determine that the touch-down event in the touch event sequence is lost between the third touch event and the first touch event, where the lost touch-down event and the first touch event belong to a same touch operation; and a third detection subunit, configured to determine whether the second identifier of the third touch event is the same as the second identifier of the first touch event if the first touch event is not the touch-down event and the third touch event is the touch-down event or the touch move event, if not, determine that the touch-up event and the touch-down event in the touch event sequence are lost before the third touch event and the first touch event, where the touch-up event and the third touch event belong to a same touch operation, and the touch-down event and the first touch event belong to a same touch operation.

In some embodiments, the first data packet further includes touch position coordinates of the first touch event.

The third data packet further includes touch position coordinates of the third touch event.

The event creation unit includes:

a position determining subunit, configured to determine touch position coordinates of the second touch event according to the touch position coordinates of the first touch event or the touch position coordinates of the third touch event; and a creation subunit, configured to create, according to the touch position coordinates of the second touch event, the second touch event including the touch position coordinates.

In some embodiments, in another possible implementation, the determining unit may include:

a monitoring unit, configured to monitor, from a moment at which the first data packet is received, whether a specified data packet is received within specified duration if the first touch event is not a touch-up event, where a first identifier in the specified data packet is the same as the first identifier of the first data packet; and a loss determining unit, configured to determine that the second data packet is lost when the specified data packet is not received within the specified duration, where the second data packet includes a touch-up event, and the second data packet and the first touch event belong to a same touch operation.

In some embodiments, the apparatus may further include:

a heartbeat monitoring unit, configured to monitor a heartbeat message within the specified duration.

The detection unit is configured to monitor, from a moment at which a heartbeat message is received if the heartbeat message is received within the specified duration, whether the specified data packet is received within the specified duration.

An embodiment of the present disclosure further provides an intelligent device. The intelligent device may include the data processing apparatus described above.

Figure 6:
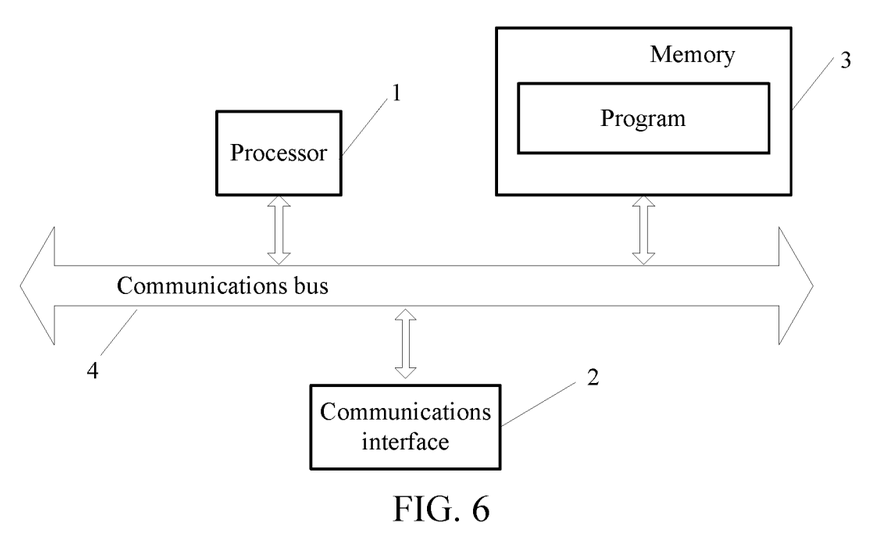
FIG. 6 is a schematic structural diagram of an embodiment of an intelligent device according to this application.

FIG. 6 is a block diagram of a hardware structure of the intelligent device. Referring to FIG. 6, the intelligent device may include a processor 1, a communications interface 2, a memory 3, and a communications bus 4.

The processor 1, the communications interface 2, and the memory 3 communicate to each other by using the communications bus 4.

In some embodiments, the communications interface 2 may be an interface of a communications module, for example, an interface of a GSM module.

The processor 1 is configured to execute a program.

The memory 3 is configured to store a program.

The program may include a program code, and the program code includes a computer operating instruction.

The processor 1 may be a central processing unit (CPU), or an application-specific integrated circuit (ASIC), or be configured to be one or more integrated circuits for implementing the embodiments of the present disclosure.

The memory 3 may include a high-speed RAM memory, or may further include a non-volatile memory, for example, at least one magnetic disk memory.

The program may be specifically used for:

receiving a first data packet sent by a control end, where the first data packet includes a first touch event and a first identifier of the first touch event, the first identifier is configured to distinguish between different touch points simultaneously generated on a touchscreen, and individual touch points sequentially generated on the touchscreen have a same first identifier;

determining, according to the first touch event and the first identifier of the first touch event, whether a second data packet is lost;

creating the second touch event corresponding to the second data packet when the second data packet is lost; and processing the second touch event, so that a controlled end can perform a touch operation to which the second touch event belongs.

It should be noted that the embodiments in this specification are all described in a progressive manner. Description of each of the embodiments focuses on differences from other embodiments. The embodiments are cross-referenced for the same or similar parts among the embodiments. The apparatus disclosed in the embodiments corresponds to the method disclosed in the embodiments, and therefore, it is briefly described. For the related part, refer to the descriptions of the method.

A person skilled in the art may further realize that, units and algorithm steps of examples described in combination with the embodiments disclosed herein can be implemented using electronic hardware, computer software, or a combination thereof. To clearly describe the interchangeability between the hardware and the software, compositions and steps of the examples have been generally described according to functions in the foregoing descriptions. Whether these functions are implemented in a mode of hardware or software depends on particular applications and design constraint conditions of the technical solutions. A person skilled in the art can use different methods to implement the described functions for each particular application, but it should not be considered that such implementation goes beyond the scope of the present disclosure.

Steps of the method or algorithm described in combination with the embodiments disclosed herein may be directly implemented using hardware, a software module executed by a processor, or a combination thereof. The software module may be placed in a random access memory (RAM), a memory, a read-only memory (ROM), an electrically programmable ROM, an electrically erasable programmable ROM, a register, a hard disk, a removable magnetic disk, a CD-ROM, or any storage medium of other forms well-known in the technical field.

The foregoing descriptions of the disclosed embodiments enable a person skilled in the art to implement or use the present disclosure. Various modifications to these embodiments are obvious to a person skilled in the art, the general principles defined herein may be implemented in other embodiments without departing from the spirit and scope of the present disclosure. Therefore, the present disclosure is not limited to these embodiments illustrated herein, but needs to conform to the broadest scope consistent with the principles and novel features disclosed herein.

What is claimed is:

1. A data processing method, comprising:
   at a device having one or more processors and memory:
   receiving a first data packet sent by a control end, the first data packet comprising a first touch event and a first identifier of the first touch event, the first identifier being configured to distinguish between different touch points simultaneously generated on a touch-sensitive surface of the control end, and to not distinguish between individual touch points sequentially generated on the touch-sensitive surface having a same first identifier;
   determining, according to the first touch event and the first identifier of the first touch event, whether a second data packet comprising a second touch event that was sequentially executed with the first touch event at the control end has been lost during transit from the control end to the device;
   in accordance with a determination that a second data packet comprising a second touch event that was sequentially executed with the first touch event at the control end has been lost during transit from the control end to the device, creating, without requiring further instruction from the control end, the second touch event corresponding to the second data packet; and
   processing the second touch event, so that a controlled end performs a respective operation in an application in accordance with a touch operation including the second touch event.

2. The method according to claim 1, wherein there is a specified generation order between the second touch event corresponding to the second data packet and the first touch event; and
   the processing the second touch event comprises:
   processing the second touch event based on the specified generation order, so that a sequential order in which the controlled end processes the second touch event and the first touch event is the same as the specified generation order.

3. The method according to claim 1, wherein determining whether a second data packet comprising a second touch event that was sequentially executed with the first touch event has been lost during transit from the control end to the device comprises:

obtaining a third data packet that is most recently received before the first data packet is received, wherein the third data packet comprises a third touch event and a first identifier of the third touch event, wherein the first identifier of the third touch event is the same as the first identifier of the first touch event; and
detecting, according to a preset touch event sequence, whether at least one touch event is missing between the third touch event and the first touch event.

4. The method according to claim 3, wherein the touch event sequence sequentially comprises a touch-down event, a touch move event, and a touch-up event; and
detecting, according to a preset touch event sequence, whether at least one touch event is missing between the third touch event and the first touch event comprises:
in accordance with a determination that the first touch event is a touch-down event:
determining whether the third touch event is a touch-up event; and,
in accordance with a determination that the third touch event is not a touch-down event, determining that a touch event that corresponds to the touch-up event in the touch event sequence is missing between the third touch event and the first touch event, wherein the missing touch-up event and the third touch event belong to a same touch operation; and
in accordance with a determination that the first touch event is not a touch-down event:
determining whether the third touch event is one of a touch-down event or a touch move event; and
in accordance with a determination that the third touch event is not one of a touch-down event or a touch move event, determining that a touch event that corresponds to the touch-down event in the touch event sequence is missing between the third touch event and the first touch event, wherein the missing touch-down event and the first touch event belong to a same touch operation.

5. The method according to claim 3, wherein the first data packet further comprises a second identifier, and the second identifier is configured to distinguish different touch operations having a same first identifier; and
detecting, according to a preset touch event sequence, whether at least one touch event is missing between the third touch event and the first touch event comprises:
detecting, according to the preset touch event sequence, a second identifier of the third touch event, and a second identifier of the first touch event, whether at least one touch event is missing between the third touch event and the first touch event.

6. The method according to claim 5, wherein the touch event sequence sequentially comprises a touch-down event, a touch move event, and a touch-up event; and
the detecting, according to the preset touch event sequence, a second identifier of the third touch event, and a second identifier of the first touch event, whether at least one touch event is missing between the third touch event and the first touch event comprises:
in accordance with a determination that the first touch event is a touch-down event:
determining whether the third touch event is a touch-up event; and
in accordance with a determination that the third touch event is not a touch-up event, determining that a touch event corresponding to the touch-up event in the touch event sequence is missing between the third touch event and the first touch event, wherein the missing touch-up event and the third touch event belong to a same touch operation;
in accordance with a determination that the first touch event is not a touch-down event:
   determining whether the third touch event is one of a touch-down event or a touch move event; and
   in accordance with a determination that the third touch event is not one of a touch-down event and a touch-move event, determining that a touch-event corresponding to the touch-down event in the touch event sequence is missing between the third touch event and the first touch event, wherein the missing touch-down event and the first touch event belong to a same touch operation; and
in accordance with a determination that the first touch event is not a touch-down event and a determination that the third touch event is not one of a touch-down event and a touch-move event:
   determining whether the second identifier of the third touch event is the same as the second identifier of the first touch event; and
   in accordance with a determination that the second identifier of the third touch event is not the same as the second identifier of the first touch event, determining that two touch events corresponding the touch-up event and the touch-down event in the touch event sequence are sequentially lost between the third touch event and the first touch event, wherein a respective one of the two missing touch events corresponding to the touch-up event in the touch event sequence and the third touch event belong to a same touch operation, and a respective one of the two missing touch events corresponding to the touch-down event in the touch event sequence and the first touch event belong to a same touch operation.

7. The method according to claim 3, wherein:
the first data packet further comprises touch position coordinates of the first touch event;
the third data packet further comprises touch position coordinates of the third touch event; and
creating the second touch event corresponding to the second data packet comprises:
   determining touch position coordinates of the second touch event according to the touch position coordinates of the first touch event or the touch position coordinates of the third touch event; and
   creating, according to the touch position coordinates of the second touch event, the second touch event comprising the touch position coordinates that have been determined for the second touch event.

8. The method according to claim 1, wherein the determining whether a second data packet comprising a second touch event that was sequentially executed with the first touch event has been lost during transit from the control end to the device comprises:
   monitoring, from a moment at which the first data packet is received, whether a specified data packet is received within specified duration in accordance with a determination that the first touch event is not a touch-up event, wherein a first identifier in the specified data packet is the same as the first identifier of the first data packet; and
   determining that a second data packet has been lost in accordance with a determination that the specified data packet is not received within the specified duration from the moment at which the first data packet is received, that the second data packet that has been lost comprises a touch-up event, and that a touch event included in the second data packet that has been lost and the first touch event belong to a same touch operation.

9. The method according to claim 8, further comprising:
in accordance with a determination that a heartbeat message is received within the specified duration of receipt of the first data packet, monitoring, from a moment at which the heartbeat message is received, whether the specified data packet is received within the specified duration of receipt of the heartbeat message.

10. A device, comprising:
one or more processors;
memory; and
a plurality of instructions stored in the memory that, when executed by the one or more processors, cause the device to perform the following operations:
   receiving a first data packet sent by a control end, the first data packet comprising a first touch event and a first identifier of the first touch event, the first identifier being configured to distinguish between different touch points simultaneously generated on a touch-sensitive surface of the control end, and to not distinguish between individual touch points sequentially generated on the touch-sensitive surface having a same first identifier;
   determining, according to the first touch event and the first identifier of the first touch event, whether a second data packet comprising a second touch event that was sequentially executed with the first touch event at the control end has been lost during transit from the control end to the device;
   in accordance with a determination that a second data packet comprising a second touch event that was sequentially executed with the first touch event at the control end has been lost during transit from the control end to the device, creating, without requiring further instruction from the control end, the second touch event corresponding to the second data packet; and
   processing the second touch event, so that a controlled end performs a respective operation in an application in accordance with a touch operation including the second touch event.

11. The device according to claim 10, wherein there is a specified generation order between the second touch event corresponding to the second data packet and the first touch event; and
the processing the second touch event comprises:
   processing the second touch event based on the specified generation order, so that a sequential order in which the controlled end processes the second touch event and the first touch event is the same as the specified generation order.

12. The device according to claim 10, wherein determining whether a second data packet comprising a second touch event that was sequentially executed with the first touch event has been lost during transit from the control end to the device comprises:
   obtaining a third data packet that is most recently received before the first data packet is received, wherein the third data packet comprises a third touch event and a first identifier of the third touch event, wherein the first identifier of the third touch event is the same as the first identifier of the first touch event; and detecting, according to a preset touch event sequence, whether at least one touch event is missing between the third touch event and the first touch event.

13. The device according to claim 12, wherein the touch event sequence sequentially comprises a touch-down event, a touch move event, and a touch-up event; and
  detecting, according to a preset touch event sequence, whether at least one touch event is missing between the third touch event and the first touch event comprises:
    in accordance with a determination that the first touch event is a touch-down event:
      determining whether the third touch event is a touch-up event; and,
      in accordance with a determination that the third touch event is not a touch-down event, determining that a touch event that corresponds to the touch-up event in the touch event sequence is missing between the third touch event and the first touch event, wherein the missing touch-up event and the third touch event belong to a same touch operation; and
    in accordance with a determination that the first touch event is not a touch-down event:
      determining whether the third touch event is one of a touch-down event or a touch move event; and
      in accordance with a determination that the third touch event is not one of a touch-down event or a touch move event, determining that a touch event that corresponds to the touch-down event in the touch event sequence is missing between the third touch event and the first touch event, wherein the missing touch-down event and the first touch event belong to a same touch operation.

14. The device according to claim 12, wherein the first data packet further comprises a second identifier, and the second identifier is configured to distinguish different touch operations having a same first identifier; and
  detecting, according to a preset touch event sequence, whether at least one touch event is missing between the third touch event and the first touch event comprises:
  detecting, according to the preset touch event sequence, a second identifier of the third touch event, and a second identifier of the first touch event, whether at least one touch event is missing between the third touch event and the first touch event.

15. A non-transitory computer readable storage medium storing a plurality of instructions configured for execution by a device having one or more processors, the plurality of instructions causing the device to perform the following operations:
  receiving a first data packet sent by a control end, the first data packet comprising a first touch event and a first identifier of the first touch event, the first identifier being configured to distinguish between different touch points simultaneously generated on a touch-sensitive surface of the control end, and to not distinguish between individual touch points sequentially generated on the touch-sensitive surface having a same first identifier;
  determining, according to the first touch event and the first identifier of the first touch event, whether a second data packet comprising a second touch event that was sequentially executed with the first touch event at the control end has been lost during transit from the control end to the device;
  in accordance with a determination that a second data packet comprising a second touch event that was sequentially executed with the first touch event at the control end has been lost during transit from the control end to the device, creating, without requiring further instruction from the control end, the second touch event corresponding to the second data packet; and
  processing the second touch event, so that a controlled end performs a respective operation in an application in accordance with a touch operation including the second touch event.

16. The non-transitory computer readable storage medium according to claim 15, wherein there is a specified generation order between the second touch event corresponding to the second data packet and the first touch event; and
  processing the second touch event comprises:
    processing the second touch event based on the specified generation order, so that a sequential order in which the controlled end processes the second touch event and the first touch event is the same as the specified generation order.

17. The non-transitory computer readable storage medium according to claim 15, wherein determining whether a second data packet comprising a second touch event that was sequentially executed with the first touch event has been lost during transit from the control end to the device comprises:
  obtaining a third data packet that is most recently received before the first data packet is received, wherein the third data packet comprises a third touch event and a first identifier of the third touch event, wherein the first identifier of the third touch event is the same as the first identifier of the first touch event; and
  detecting, according to a preset touch event sequence, whether at least one touch event is missing between the third touch event and the first touch event.

18. The non-transitory computer readable storage medium according to claim 17, wherein the touch event sequence sequentially comprises a touch-down event, a touch move event, and a touch-up event; and
  detecting, according to a preset touch event sequence, whether at least one touch event is missing between the third touch event and the first touch event comprises:
    in accordance with a determination that the first touch event is a touch-down event:
      determining whether the third touch event is a touch-up event; and,
      in accordance with a determination that the third touch event is not a touch-down event, determining that a touch event that corresponds to the touch-up event in the touch event sequence is missing between the third touch event and the first touch event, wherein the missing touch-up event and the third touch event belong to a same touch operation; and
    in accordance with a determination that the first touch event is not a touch-down event:
      determining whether the third touch event is one of a touch-down event or a touch move event; and
      in accordance with a determination that the third touch event is not one of a touch-down event or a touch move event, determining that a touch event that corresponds to the touch-down event in the touch event sequence is missing between the third touch event and the first touch event, wherein the missing touch-down event and the first touch event belong to a same touch operation.

19. The non-transitory computer readable storage medium according to claim 17, wherein the first data packet further comprises a second identifier, and the second identifier is configured to distinguish different touch operations having a same first identifier; and
    detecting, according to a preset touch event sequence, whether at least one touch event is missing between the third touch event and the first touch event comprises:
    detecting, according to the preset touch event sequence, a second identifier of the third touch event, and a second identifier of the first touch event, whether at least one touch event is missing between the third touch event and the first touch event.

20. The non-transitory computer readable storage medium according to claim 19, wherein the touch event sequence sequentially comprises a touch-down event, a touch move event, and a touch-up event; and
    detecting, according to the preset touch event sequence, a second identifier of the third touch event, and a second identifier of the first touch event, whether at least one touch event is missing between the third touch event and the first touch event comprises:
  in accordance with a determination that the first touch event is a touch-down event:
    determining whether the third touch event is a touch-up event; and
    in accordance with a determination that the third touch event is not a touch-up event, determining that a touch event corresponding to the touch-up event in the touch event sequence is missing between the third touch event and the first touch event, wherein the missing touch-up event and the third touch event belong to a same touch operation;
  in accordance with a determination that the first touch event is not a touch-down event:
    determining whether the third touch event is one of a touch-down event or a touch move event; and
    in accordance with a determination that the third touch event is not one of a touch-down event and a touch-move event, determining that a touch-event corresponding to the touch-down event in the touch event sequence is missing between the third touch event and the first touch event, wherein the missing touch-down event and the first touch event belong to a same touch operation; and
  in accordance with a determination that the first touch event is not a touch-down event and a determination that the third touch event is not one of a touch-down event and a touch-move event:
    determining whether the second identifier of the third touch event is the same as the second identifier of the first touch event; and
    in accordance with a determination that the second identifier of the third touch event is not the same as the second identifier of the first touch event, determining that two touch events corresponding the touch-up event and the touch-down event in the touch event sequence are sequentially lost between the third touch event and the first touch event, wherein a respective one of the two missing touch events corresponding to the touch-up event in the touch event sequence and the third touch event belong to a same touch operation, and a respective one of the two missing touch events corresponding to the touch-down event in the touch event sequence and the first touch event belong to a same touch operation.

\* \* \* \* \*